United States Patent
Sugiyama (10) Patent No.: US 9,958,580 B2
(45) Date of Patent: May 1, 2018

(54) ANISOTROPIC OPTICAL FILM

(71) Applicant: Tomoegawa Co., Ltd., Tokyo (JP)

(72) Inventor: Masahide Sugiyama, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 0 days. days.

(21) Appl. No.: 14/648,372

(22) PCT Filed: Nov. 29, 2013

(86) PCT No.: PCT/JP2013/082204
§ 371 (c)(1),
(2) Date: May 29, 2015

(87) PCT Pub. No.: WO2014/084361
PCT Pub. Date: Jun. 5, 2014

(65) Prior Publication Data
US 2015/0346396 A1     Dec. 3, 2015

(30) Foreign Application Priority Data
Nov. 29, 2012  (JP) .................................. 2012-260862

(51) Int. Cl.
G02B 5/02       (2006.01)
G02F 1/1335     (2006.01)

(52) U.S. Cl.
CPC ......... *G02B 5/0257* (2013.01); *G02B 5/0236* (2013.01); *G02F 1/133504* (2013.01)

(58) Field of Classification Search
CPC ........ G02B 3/08; G02B 5/0278; G02B 5/045; G02B 5/0257; G02B 5/02; G02B 5/0236;
(Continued)

(56) References Cited

U.S. PATENT DOCUMENTS 4,929,523 A      5/1990  Kitayama et al.
6,368,760 B1 *   4/2002  Nishiguchi ....... G02F 1/133528
                                                       252/585
(Continued)

FOREIGN PATENT DOCUMENTS

CN    1289054 A    3/2001
CN    1474950 A    2/2004
(Continued)

OTHER PUBLICATIONS

English translation of JP 2012-141593, machine translated on Jul. 6, 2016.*
(Continued)

*Primary Examiner* — Jie Lei
(74) *Attorney, Agent, or Firm* — Muncy, Geissler, Olds & Lowe, P.C.

(57) ABSTRACT

Provided is an anisotropic optical film which is capable of diffusing and condensing light in a wide incident angle range even when this film merely has a single anisotropic diffusion layer, which gives no unnatural impression, and which does not easily generate any light interference (rainbow). An anisotropic optical film having a diffusing property which varies in accordance with the incident angle of light radiated thereinto. The film has rectangularly columnar region, and a matrix region. At an incident angle of the light at which a maximum linear transmittance is exhibited, the maximum linear transmittance is 30% or more and less than 95%; and at an incident angle of the light at which a minimum linear transmittance is exhibited, the minimum linear transmittance is 20% or less.

8 Claims, 5 Drawing Sheets

(58) Field of Classification Search
CPC .. G02B 5/3083; G02B 27/0018; G02B 27/26;
G02B 27/283; G02F 1/1335; G02F
1/133504; G02F 1/133711; C09K 19/42;
B32B 3/30; B44B 1/1712
USPC ...... 359/465, 489.11, 489.19, 599, 613, 614,
359/601, 742; 428/1.1, 1.2, 131, 167,
428/168, 172, 201, 206, 207, 163, 913
See application file for complete search history.

(56) References Cited

U.S. PATENT DOCUMENTS

| | | |
|---|---|---|
| 6,398,370 B1 | 6/2002 | Chiu et al. |
| 6,517,914 B1 | 2/2003 | Hiraishi |
| 2009/0244447 A1 | 10/2009 | Hou et al. |
| 2010/0195313 A1 | 8/2010 | Hiraishi et al. |

FOREIGN PATENT DOCUMENTS

| | | |
|---|---|---|
| EP | 1855127 A1 | 11/2007 |
| EP | 1855127 A2 | 12/2007 |
| JP | 2547417 | 8/1996 |
| JP | 2001-159704 | 6/2001 |
| JP | 2002-014240 | 1/2002 |
| JP | 2004-514167 | 5/2004 |
| JP | 2009-265406 | 11/2009 |
| JP | 2011-107405 | 6/2011 |
| JP | 2012-141593 | 7/2012 |

OTHER PUBLICATIONS

Office Action of corresponding Taiwanese application No. 102143695 dated Mar. 16, 2017 and English translation thereof.

* cited by examiner

ANISOTROPIC OPTICAL FILM

BACKGROUND OF THE INVENTION

The present invention relates to an anisotropic optical film having therein rectangular-column-shaped structures.

A member having light diffusing property is used in a display device as well as lightening equipment or a building member. Examples of this display device include a liquid crystal display device (LCD), and an organic electroluminescence element (organic EL). A mechanism that the light diffusing member expresses light diffusion is classified into light scattering based on irregularities formed in a surface (surface light scattering), light scattering based on a difference in refractive index between a matrix resin and fine particles dispersed therein (interior light scattering), and light scattering based on both of surface light scattering and interior light scattering. However, such light diffusing members are generally isotropic in diffusing performance. Thus, when the incident angle of light thereinto is somewhat varied, the diffusibility of the resultant transmitted light is not largely changed.

Figure 10:
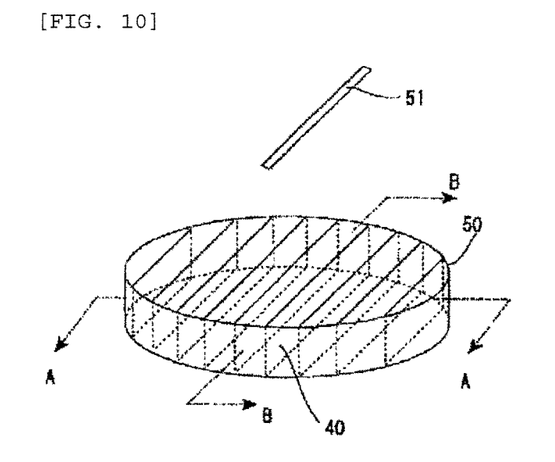
FIG. 10 is a schematic view of a conventional anisocropic optical film.
Figure 12:
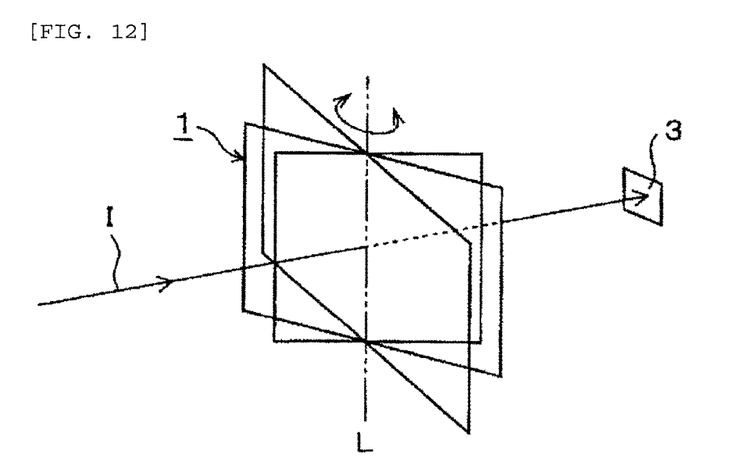
FIG. 12 illustrates a method for measuring an optical profile of an anisotropic optical film.

In the meantime, an anisotropic optical film is known, which intensely diffuses incident light with an angle in a predetermined angle range but transmits incident light with an angle outside the range (for example, JP 2547417 B2). This anisotropic optical film is a film obtained by using a linear light source to radiate light onto a sheet-form photosensitive composition layer from above this layer to cure the composition. It is considered that as illustrated in FIG. 10, inside a base of the sheet form, tabular structures 40 different in refractive index from a region around these structures are formed in parallel with each other to be extended consistently with the length direction of the linear light source, which is a source 51, arranged above the anisotropic optical film, which is a film 50, when the film 50 is produced. As illustrated in FIG. 12, a sample 1 (anisotropic optical film) is arranged between a light source not illustrated, and a light receiving unit 3. While the angle of the sample is varied around a central axis that is a straight line L on the front surface of the sample, light is straightly transmitted through the sample. The linear transmittance of the light radiated into the light receiving unit 3 is measurable.

Figure 11:
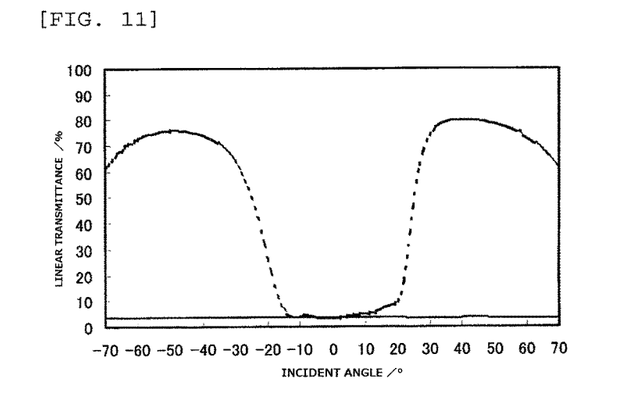
FIG. 11 is a graph showing the linear transmittance of an anisotropic optical film having tabular structures.

FIG. 11 is a graph showing the incident angle dependency of the scattering property that the anisotropic optical film 50 illustrated in FIG. 10 has, the dependency being measured using the method illustrated in FIG. 12. FIG. 11 is a graph obtained by evaluating the film 50 that is an anisotropic optical film having tabular structures in the same manner as Comparative Examples 2 and 3, which will be described later, have. Its vertical axis represents the linear transmittance (of the film) (i.e., the following light quality when parallel rays having a predetermined light quantity are radiated into the film: the light quantity of parallel rays radiated out therefrom in a direction identical with the incident direction), which is an index showing the degree of scattering (of the film). Its horizontal axis represents the indent angle of the rays. A solid line and a broken line in FIG. 11 show cases of rotating the anisotropic optical film 50, respectively, around the center of an axis A-A (penetrating the tabular structures) and around the center of an axis B-B (parallel with the tabular structures) in FIG. 10. The plus and minus signs of the incident angle denote that directions along each of which the anisotropic optical film 50 is rotated are reverse to each other. According to the solid line in FIG. 11, the linear transmittance is kept small whether the light is radiated in the front direction or in any oblique direction. This matter means that when the anisotropic optical film 50 is rotated around the center of the axis A-A, the anisotropic optical film 50 is in a light scattering state regardless of the incident angle. According to the broken line in FIG. 11, the linear transmittance is small in any direction in the vicinity of 0°. This matter means that also when the anisotropic optical film 50 is rotated around the axis B-B as a center, the anisotropic optical film 50 is in a light scattering state for the light in the front surface direction. Furthermore, in any direction along which the incident angle is large, the linear transmittance is increased. This matter means that when the anisotropic optical film 50 is rotated around the center of the axis B-B, the anisotropic optical film 50 is in a light transmissible state for the light in any oblique direction. This structure can give a property that in transverse directions the transmittance is varied in accordance with the incident angle while in vertical directions the transmittance is not changed even when the incident angle is varied. A curve as shown in FIG. 11, which represents the incident angle dependency of the scattering property (of any member), is called an "optical profile" thereof hereinafter. The optical profile does not directly represent the scattering property. However, when it is interpreted that as the linear transmittance is lowered, the diffuse transmittance is conversely increased, it can be concluded that the optical profile generally represents diffusion property.

About the anisotropic optical film 50, optical properties thereof are determined by the inclination of the film to a normal line of its tabular structures 40. In this case, incident light along directions substantially parallel with the tabular structures 40 is intensely diffused. Light radiated into the tabular structures to penetrate the structures is transmitted without being substantially diffused. Thus, it can be mentioned that the tabular structures 40 are light scattering surfaces.

The nature of this anisotropic optical film 50 depends on the inclination of the tabular structures and the inclination of the incident light. Accordingly, the range of incident angles at which the light is intensely diffused is restricted. Moreover, when the incident angle is varied, the diffusing property of the anisotropic optical film 50 is very sharply changed. Thus, when the optical film 50 is applied to a display device, this property is exhibited as a sharp change of the device in visibility so that the device may give an unnatural impression. In order to solve this problem, given is a method of laminating, onto each other, anisotropic optical films in which their tabular structures are made different from each other in inclination. However, this method has a problem of requiring many costs. Thus, the method is required to be improved. Additionally, in any anisotropic optical film having tabular structures, a light interference (rainbow) is easily generated, and thus this film is required to be improved in visibility.

SUMMARY OF INVENTION

An object of the present invention is to provide an anisotropic optical film which is capable of diffusing and condensing light in a wide incident angle range even when this film merely has a single anisotropic diffusion layer, which gives no unnatural impression, and which does not easily generate any light interference (rainbow).

The present invention can solve the afore-mentioned problems through the following technical subject matters:

(1) An anisotropic optical film having a diffusing property which varies in accordance with the incident angle of light radiated thereinto, the film having a plurality of rectangularly columnar regions, and a matrix region, at a value of the incident angle at which a maximum linear transmittance is exhibited, the maximum linear transmittance being 30% or more and less than 95%, and at a value of the incident angle at which a minimum linear transmittance is exhibited, the minimum linear transmittance being 20% or less.

(2) The anisotropic optical film according to item (1), wherein the aspect ratio between the short diameter and the long diameter of the rectangularly columnar regions ranges from 2 to 40.

(3) The anisotropic optical film according to item (1), wherein the rectangularly columnar regions have a thickness ranging from 30 μm to 200 μm.

(4) The anisotropic optical film according to item (1), wherein the range of angles of an incident light diffusion field that corresponds to linear transmittances that are ½ or less of the difference between the maximum linear transmittance and the minimum linear transmittance is from 50° to 80°.

(5) The anisotropic optical film according to item (2), wherein the short diameter has a length ranging from 0.5 μm to 5.0 μm.

(6) The anisotropic optical film according to item (2), wherein the long diameter has a length ranging from 3.0 μm to 50 μm.

(7) A display device, including the anisotropic optical film according to item (1).

(8) A method for producing an anisotropic optical film, including the steps of: obtaining parallel rays from a light source, radiating the parallel rays into a directional diffusion element to yield light rays having directivity, and radiating the light rays having the directivity into a photocurable composition layer to cure the photocurable composition layer.

(9) The method for producing an anisotropic optical film according to item (8), wherein the light rays having the directivity have an aspect ratio ranging from 2 to 40.

The present invention makes it possible to provide an anisotropic optical film which is capable of diffusing and condensing light in a wide incident angle range even when this film merely has a single anisotropic diffusion layer, which gives no unnatural impression, and which does not easily generate any light interference (rainbow).

BRIEF DESCRIPTION OF DRAWINGS

FIGS. 1(a) and 1(b) are schematic views of an anisotropic optical film of the present invention.

DETAILED DESCRIPTION OF THE INVENTION

Herein, a description is made about the definition of each term in the present items and the present specification.

The terms "low-refractive-index region" and "high-refractive-index region" are regions of an anisotropic optical film that are formed by a local level difference of the refractive index of a material constituting this film, and the terms relatively show whether one of the regions is higher or lower in refractive index than the other. These regions are formed when the material constituting the anisotropic optical film is cured.

The term "diffusion central axis" (of a film or an anisotropic optical film) means, when the incident angle of light (to the film) is varied, a direction consistent with a varied incident angle value (of the light) about which the scattering property of the film has substantial symmetries with each other. The reason why the "film has substantial symmetries with each other" is that the film does not strictly have symmetric property of an optical property. The diffusion central axis is found out by observing the inclination of a cross section of the film through an optical microscope, or observing the projected shape of the light through the anisotropic optical film while the incident angle is varied.

The linear transmittance of an anisotropic optical film is concerned with the linear transparency of light radiated into the film. When the light is radiated thereinto at an incident angle, the linear transmittance is the ratio between the transmitted light quantity in the direction of the straight line, and the light quantity of the incident (or radiated-into) light, and is represented by the following expression:

Linear transmittance (%)=("linear transmitted light quantity"/"incident light quantity")×100

In the present invention, the term "scattering" and "diffusion" are used without distinguishing the two from each other, and the two have the same meaning.

Hereinafter, the contents of the present invention will be described.

Figure 1A:
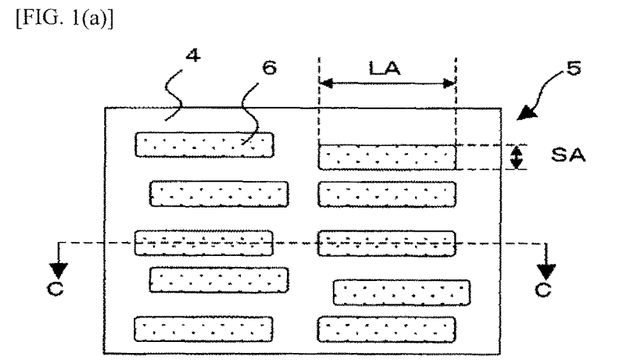
FIG. 1(a) is a plan view thereof.
Figure 1B:
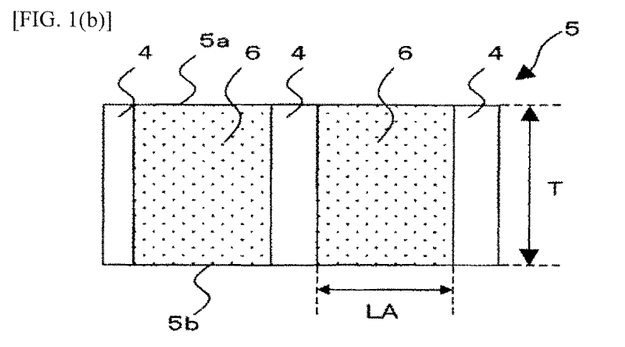
FIG. 1(b) is a sectional view thereof.

FIG. 1 are schematic views of an anisotropic optical film 5 of the present invention. FIG. 1(a) is a plan view of the anisotropic optical film 5, and FIG. 1(b) is a sectional view of the anisotropic optical film 5 that is obtained by cutting the film on a line C-C in FIG. 1(a).

As illustrated in FIG. 1, the anisotropic optical film 5 has a plurality of rectangularly columnar regions 6, and a matrix region 4. The rectangularly columnar regions 6 and the matrix region 4 are irregular in distribution and shape. However, these regions are formed to be extended over the whole of the plane of the anisotropic optical film. Thus, optical properties (for example, the linear transmittance, which will be detailed later) obtained therefrom are each substantially unvaried even when the optical property is measured at any moiety of the film. Since the rectangularly columnar regions 6 and the matrix region 4 are irregular in distribution and shape, a light interference (rainbow) is scarcely generated in the anisotropic optical film 5 of the present invention.

As illustrated in FIG. 1(a), the front surface shape of each of the rectangularly columnar regions 6 has a short diameter SA and a long diameter LA. The short diameter SA and the long diameter LA can be checked (plan view) by observing the anisotropic optical film 5 through an optical microscope. It is sufficient for the front surface shape of each of the rectangularly columnar regions 6 to permit a diffusion field, which will be detailed later, to be satisfied. The shape may be in a straight line form or waved form, or in such a form that the two forms are mixed with each other.

As illustrated in FIG. 1(b), the shape of a cross section of the rectangularly columnar regions 6 is formed to arrange the rectangularly columnar regions 6 alternately with portions of the matrix region 4. In FIG. 1(b), the rectangularly columnar regions 6 are extended in a straight line form in the direction of the thickness T of the film. However, the rectangularly columnar regions 6 may be extended in a straight line form or in a waved form, or may be bent. These forms may be mixed with each other.

It is sufficient for the refractive index of the matrix region 4 to be different from that of the rectangularly columnar regions 6. The degree of the refractive index difference is not particularly limited, and the respective refractive indexes of the two region species are relative to each other. When the matrix region 4 is lower in refractive index than the rectangularly columnar regions 6, the matrix region 4 is to be a low-refractive-index region. Conversely, when the matrix region 4 is higher in refractive index than the rectangularly columnar regions 6, the matrix region 4 is to be a high-refractive-index region.

It is preferred that the refractive index of the interface between the matrix region 4 and the rectangularly columnar regions 6 are gradually increasingly changed. The gradually increasing change does not easily cause a problem that, when the incident angle of light is varied, a change in the diffusing property of the film makes very sharp, which results in likely giving an unnatural impression. When the matrix region 4 and the rectangularly columnar regions 6 are formed by phase separation following irradiation with light, the refractive index of the interface between the matrix region 4 and the rectangularly columnar regions 6 can be gradually increasingly changed.

The lower limit of the aspect ratio between the short diameter SA and the long diameter LA is preferably 2, more preferably 4, even more preferably 6. As the aspect ratio becomes smaller, there is a problem with the maximum linear transmittance becoming lower at an incident angle at which a maximum linear transmittance is exhibited.

The upper limit of the aspect ratio between the short diameter SA and the long diameter LA is preferably 40, more preferably 25, even more preferably 15. As the aspect ratio becomes larger, there is a problem with the diffusion field of light becoming narrower. Furthermore, as the aspect ratio becomes larger, there is a problem with a light interference (rainbow) being more easily generated.

Any of these lower limit values of the aspect ratio may be appropriately combined with any of the upper limit values thereof. When the aspect ratio of the rectangularly columnar regions 6 is set into, for example, the range of 2 to 40, the diffusion field can be widened and further the problem is not easily caused that when the incident angle of light is varied, the anisotropic optical film is very sharply changed in diffusing property to give an unnatural impression easily.

The lower limit of the length of the short diameter SA of the rectangularly columnar regions 6 is preferably 0.5 µm, more preferably 1.0 µm. As the short diameter SA becomes shorter, there is a problem with the anisotropic optical film becoming more insufficient in light diffusing property and light condensing property.

The upper limit value of the length of the short diameter SA of the rectangularly columnar regions 6 is preferably 5.0 µm, more preferably 3.0 µm, even more preferably 2.0 µm. As the short diameter SA becomes longer, there is a problem with the diffusion field becoming narrower.

Any of these lower limit values of the short diameter SA of the rectangularly columnar regions 6 may be appropriately combined with any of the upper limit values thereof. When the short diameter SA of the rectangularly columnar regions 6 is set into, for example, the range of 0.5 µm to 5.0 µm, the diffusion field can be widened and further the anisotropic optical film becomes sufficient in light diffusing property and light condensing property.

The lower limit of the length of the long diameter LA of the rectangularly columnar regions 6 is preferably 3.0 µm, more preferably 5 µm. As the long diameter LA becomes smaller, there is a problem with the diffusion field becoming narrower.

The upper limit value of the length of the long diameter LA of the rectangularly columnar regions 6 is preferably 40 µm, more preferably 20 µm, even more preferably 10 µm. As the long diameter LA becomes larger, there is a problem with the diffusion field becoming narrower or a problem further in that when the incident angle of light is varied, the anisotropic optical film is very sharply changed in diffusing property to give an unnatural impression easily. Moreover, when the long diameter LA becomes large, a problem is also caused that a light interference (rainbow) is easily generated.

Any of these lower limit values of the long diameter LA of the rectangularly columnar regions 6 may be appropriately combined with any of the upper limit values thereof. When the long diameter LA of the rectangularly columnar regions 6 is set into, for example, the range of 3.0 µm to 40 µm, the diffusion field can be widened and further a problem is solved that when the incident angle of light is varied, the anisotropic optical film is very sharply changed in diffusing property to give an unnatural impression easily.

When the thickness T of the rectangularly columnar regions 6 is set into the range of 30 µm to 200 µm, problems about costs are reduced and further the resultant images become sufficient in contrast.

The lower limit of the thickness T of the rectangularly columnar region 6 is preferably 30 µm, more preferably 50 µm. As the thickness T is made smaller, the anisotropic optical film has a problem of becoming more insufficient in light diffusing property and light condensing property.

The upper limit of the thickness T of the rectangularly columnar regions 6 is preferably 200 µm, more preferably 150 µm, even more preferably 100 µm. As the thickness T is made larger, there are caused a problem that costs are increased by large material costs required, a great deal of time required for the production, and others, and a problem that the resultant images more easily involve blur generated by an increase in diffusion in the thickness T direction to be lowered in contrast.

Any of these lower limits of the thickness T of the rectangularly columnar regions 6 may be appropriately combined with any of the upper limits thereof.

About the aspect ratio of the rectangularly columnar regions 6, the length of the short diameter SA, that of the long diameter LA, and the thickness T, respective appropriate values in the above-mentioned numerical ranges may be combined with each other.

In FIG. 1(b), an upper surface 5a and a lower surface 5b of the anisotropic optical film 5 are illustrated. The upper surface 5a and the lower surface 5b are called for convenience. When the anisotropic optical film 5 is turned upside down, these are reversely called (the lower surface and the upper surface). The surface form of the upper surface 5a of the anisotropic optical film 5 is preferably made different from that of the lower surface 5b thereof. This manner makes it possible to reduce the generation of a light interference (rainbow) in the anisotropic optical film 5 of the present invention. The respective surface forms of the upper and lower surfaces 5a and 5b can be made different from each other by forming the matrix region 4 and the rectangularly columnar regions 6 by phase separation following irradiation with light.

The production of the anisotropic optical film by the phase separation may make it difficult to observe either one of the upper and lower surfaces 5a and 5b through an optical microscope. The rectangularly columnar regions 6 are being gradually formed from the surface irradiated with light in the thickness direction T; the difficulty is based on a matter that the rectangularly columnar regions 6 reach the other surface (the surface opposite to the surface irradiated with the light) and subsequently the rectangularly columnar regions 6 further extend. In such a case, the rectangularly columnar regions 6 are easily checked by observing the other surface firstly-mentioned herein through an optical microscope.

The present invention preferably has a structure in which interfaces between the rectangularly columnar regions 6 and portions of the matrix region 4 are continuously present without being interrupted in the thickness T direction (Z direction) of the anisotropic diffusion layer which is a single layer. When the anisotropic optical film has the structure, in which the interfaces between the rectangularly columnar regions 6 and the portions of the matrix region 4 are continuous, light diffusion and light condensation are continuously generated with ease while light passes through the anisotropic optical film 5. Thus, the anisotropic optical film 5 is improved in light diffusing and light condensing efficiencies. However, if the rectangularly columnar regions and the portions of the matrix region are present to be mainly speckled with each other in patches in a cross section of the anisotropic optical film 5, the anisotropic optical film 5 does not unfavorably gain light condensing property, which is one of the advantages of the present invention, with ease.

At a value of the incident angle of light at which the anisotropic optical film has a maximum linear transmittance, the maximum linear transmittance is preferably 30% or more and less than 95%. The upper limit value of the maximum linear transmittance is more preferably 80% or less, even more preferably 70% or less. The lower limit value of the maximum linear transmittance is more preferably 40% or more, even more preferably 50% or more.

When the maximum linear transmittance is set into this range, the diffusion field is widened and further a problem is not easily caused that when the incident angle is varied, the anisotropic optical film is very sharply changed in diffusing property to give an unnatural impression easily. As the maximum linear transmittance is made lower, a light interference (rainbow) is favorably less caused. However, if the maximum linear transmittance is too low, a problem that the diffusion field becomes narrow is caused.

Additionally, the anisotropic optical film can be made appropriate in anisotropy, and thus the applicable scope of this film can be widened. When the anisotropic optical film is used in, for example, a display device, an excessively intense anisotropy makes the light diffusing property and light condensing property very good in the horizontal direction, but makes those insufficient in the vertical direction, which is a problem. The anisotropic optical film of the present invention has the above-mentioned maximum linear transmittance, thereby maintaining excellent light diffusing and condensing properties in the horizontal direction, and further having light diffusing and condensing properties sufficiently in the vertical direction.

At a value of the incident angle of light at which the anisotropic optical film has a minimum linear transmittance, the minimum linear transmittance is preferably 20% or less. As the minimum linear transmittance is lowered, the film is reduced in linear transmitted light quantity (i.e., is increased in haze value). Thus, as the minimum linear transmittance is lowered, the film is increased in diffusion light quantity. It is more preferred that the minimum linear transmittance is lower. The minimum linear transmittance is preferably 10% or less, more preferably 5% or less. The lower limit value thereof is not limited, and is, for example, 0%.

The linear transmitted light quantity and the linear transmittance (of any film) are measurable by a method illustrated in FIG. 12. Specifically, a rotary axis L represented in FIG. 12 is made consistent with an axis C-C represented in FIG. 1(a), and the linear transmitted light quantity and the linear transmittance are measured at each incident angle (under a condition that the normal line direction is regarded as zero degree). From the resultant data, an optical profile of the film is obtained. From this optical profile, the maximum linear transmittance and the minimum linear transmittance are obtained.

When an axis orthogonal to the axis C-C is made consistent with the rotary axis L represented in FIG. 12 and the linear transmitted light quantity and the linear transmittance are measured at each incident angle, the linear transmittance is shown near zero regardless of the incident angle, as shown in FIG. 11.

According to the above description, the maximum linear transmittance and the minimum linear transmittance of the anisotropic optical film are obtained, and then the difference between the maximum and minimum linear transmittances is obtained. A straight line having a value of ½ of this difference is prepared on the optical profile, and two intersections at each of which this straight line and the optical profile intersect are obtained. Incident angles corresponding to the respective intersections are read out. In the optical profile, under a condition that the normal line direction is regarded as zero degree, individual incident angles are shown as minus and plus directions. Accordingly, the incident angles, and the incident angles corresponding to the respective intersections may each have a minus value. When values of the two intersections are a plus incident angle value and a minus incident angle value, the sum of the absolute value of the minus incident angle value and the plus incident angle value is an angle range of the incident-light diffusion field.

When both of the values of the two intersections are plus, the difference obtained by subtracting smaller one of the values from larger one thereof is an angle range of the incident-light diffusion field. When both of the values of the two intersections are minus, the respective absolute values of the values are taken up and then the difference obtained by subtracting smaller one of the absolute values from larger one thereof is an angle range of the incident-light diffusion field.

It is preferred to set, into the range of 50° to 80°, the angle range of the incident-light diffusion field corresponding to the linear transmittances that are ½ or less of the difference between the maximum and minimum linear transmittances. If this angle range of the incident-light diffusion field is smaller than 50°, an advantageous effect is produced which is not different very much from that of any conventional anisotropic optical film. The angle range of the diffusion field is more preferably from 60° to 80°. When an anisotropic optical film (as according to the present invention) has rectangularly columnar regions, an angle range of 50° or more can be given thereto. However, if the angle range of the incident-light diffusion field is more than 80°, the light condensing property is unfavorably damaged.

The angle at which the rectangularly columnar regions that is linearly extended intensely scatters light, the angle being dependent on the material for forming the anisotropic optical film, is an angle when the difference in inclination between the rectangularly columnar region and the advancing direction of the light is about a range of ±10°. By bending the rectangularly columnar structure into the thickness T direction of the rectangularly columnar region to be extended, a region where light is intensely scattered can be widened. This is because the bending causes the rectangularly columnar region to have plural angle ranges in each of which light is intensely scattered.

The inclination of the rectangularly columnar region means the following direction when the incident angle of light is varied: a direction consistent with the incident angle which gives substantial symmetry to the scattering property as a boundary. The reason why the "scattering property of the film has substantial symmetries with each other" is that the light does not strictly have symmetric property of an optical property. The inclination of the rectangularly columnar region is found out by observing the inclination of a cross section of the film through an optical microscope, or observing the projected shape of the light through the anisotropic optical film while the incident angle is varied.

When the rectangularly columnar regions are bent, the angle (bending angle) thereof is preferably from 10° to 40°, more preferably from 15° to 25°. In this case, the anisotropic optical film can attain an effective diffusion. In this way, regions where light is intensely scattered can be made wider. Moreover, the regions where light is intensely scattered can be continuously formed so that the light condensing property can be heightened while the intensity of the light is kept substantially constant.

When the rectangularly columnar regions have plural inclinations, each of the inclinations is preferably in a range of ±70° under a condition that the normal line direction is regarded as zero degree. If the inclination is smaller than −70° or larger than +700, light exceeding each of these upper limit values is easily reflected on the front surface of the anisotropic optical film so that the light is not easily radiated into this film, this situation being depending onto the material for forming the anisotropic optical film. The number of the inclinations is not limited, and is preferably between 2 and 5. If the number of the inclinations is increased, the anisotropic optical film increases in thickness to be lowered in productivity.

At least one of the inclinations is preferably in a range of ±50 (when the normal line direction is regarded as zero degree), and further the inclination of the other diffusion central axis or axes ranges preferably from −15° to −5°, or from +50 to +15°. This manner makes it possible to make the regions where light is intensely scattered wider. Moreover, the regions where light is intensely scattered can be continuously formed so that the light condensing property can be heightened while the intensity of the light is kept substantially constant.

The shape that (each of) the inclination(s) is bent may be such a shape that a bent portion is bent into a substantially straight line form, is gradually bent (in, for example, a curved line form), or is sharply changed (into a straight line form). This case easily produces the advantageous effects of the present invention. In the present invention, it is preferred that the bending direction is gradually changed without being interrupted in the extended direction. The gradual change without the interruption makes it possible to diffuse and condense light effectively.

Such an inclination-bent structure is adjustable in accordance with the aspect ratio between the short and long diameters SA and LA of the rectangularly columnar structures, the thickness T and others.

The anisotropic optical film of the present invention may be an anisotropic optical film including an anisotropic diffusion layer having one surface on which a different layer is located. Examples of the different layer include an adhesive layer, a light polarizing layer, a light diffusion layer, a low-reflective layer, an antifouling layer, an antistatic layer, an ultraviolet/near-infrared-ray (NIR) absorbing layer, a neon cutting layer, and an electromagnetic shielding layer. Such different layers may be successively laminated onto each other.

Such different layers may be laminated onto both surfaces of the anisotropic diffusion layer, respectively. The different layers laminated on both the surfaces, respectively, may be layers having the same function, or layers having different functions.

Method for Producing Anisotropic Optical Film

The anisotropic optical film of the present invention can be produced by radiating UV rays to a specific photocurable composition layer under especial conditions. Hereinafter, the raw material of the anisotropic optical film will be firstly described and a process for the production will be secondly described.

Raw Material of Anisotropic Optical Film

The raw material for forming the anisotropic optical film of the present invention is a material which is composed of a photoinitiator, and a photocurable compound selected from macromonomers, polymers, oligomers, and monomers each having a radical polymerizable or cation polymerizable functional group, and which is polymerized and solidified by irradiation with ultraviolet and/or visible rays.

Even when the material for forming the anisotropic optical film is of a single species, a refractive index difference is generated therein by a matter that a level difference in density is generated therein for the following reason: a portion thereof where the irradiation intensity of the UV is large has a large curing speed; thus, the curable material shifts in the vicinity of the cured region, so that a region high in refractive index and a region low in refractive index are formed.

The word "(meth)acrylate" denotes that the word may be either acrylate or methacrylate.

The radical polymerizable compounds are each mainly a compound having, in the molecule thereof, one or more unsaturated double bonds. Specific examples thereof include acrylic oligomers called through respective names of epoxy acrylate, urethane acrylate, polyester acrylate, polyether acrylate, polybutadiene acrylate, and silicone acrylate; and acrylic monomers such as 2-ethylhexyl acrylate, isoamyl acrylate, butoxyethyl acrylate, ethoxydiethylene glycol acrylate, phenoxyethyl acrylate, tetrahydrofurfuryl acrylate, isonorbornyl acrylate, 2-hydroxyethyl acrylate, 2-hydroxypropyl acrylate, 2-acryloyloxy phthalate, dicyclopentenyl acrylate, triethylene glycol diacrylate, neopentyl glycol diacrylate, 1,6-hexanediol diacrylate, an EO adduct diacrylate of bisphenol A, trimethylolpropane triacrylate, EO-modified trimethylolpropane triacrylate, pentaerythritol triacrylate, pentaerythritol tetraacrylate, ditrimethylolpropane tetraacrylate, and dipentaerythritol hexaacrylate. These compounds may be used alone, or in the form of a mixture of two or more thereof. In the same way, a mechacrylate is usable. In general, acrylates are larger in photopolymerization rate than methacrylates, and thus the formers are preferred.

The cation polymerizable compounds may each be a compound having in the molecule thereof one or more selected from epoxy, vinyl ether and oxetane groups. Examples of the compound having epoxy groups include 2-ethylhexyl diglycol glycidyl ether, glycidyl ether of biphenyl, any diglycidyl ether of a bisphenol such as bisphenol A, hydrogenated bisphenol A, bisphenoi F, bisphenol AD, bisphenol S, tetramethylbisphenol A, tetramethylbisphenol F, tetrachlorobisphenol A, or tetrabromobisphenol A; any polyglycidyl ether of a novolak resin such as phenol novolak, cresol novolak, brominated phenol novolak, or o-cresol novolak; any diglycidyl ether of an alkylene glycol such as ethylene glycol, polyethylene glycol, polypropylene glycol, butanediol, 1,6-hexanediol, neopentyl glycol, trimethylolpropane, 1,4-cyclohexanedimethanol, an EO adduct of bisphenol A, or a PO adduct of bisphenol A; and glycidyl esters such as a glycidyl ester of hexahydrophthalic acid, and a diglycidyl ester of dimer acid.

Additional examples of the compound having epoxy groups include alicyclic epoxy compounds such as 3,4-epoxycyclohexylmethyl 3',4'-epoxycyclohexanecarboxylate, 2-(3,4-epoxycyclohexyl-5,5-spiro-3,4-epoxy)cyclohexane-meta-dioxane, di(3,4-epoxycyclohexylmethyl) adipate, di(3,4-epoxy-6-methylcyclohexylmethyl) adipate, 3,4-epoxy-6-methylcyclohexyl-3',4'-epoxy-6'-methyl cyclohexanecarboxylate, methylenebis(3,4-epoxycyclohexane), dicyclopentadiene diepoxide, di(3,4-epoxycyclohexylmethyl)ether of ethylene glycol, ethylenebis(3,4-epoxycyclohexanecarboxylate, lactone-modified 3,4-epoxycyclohexylmethyl-3',4'-epoxycyclohexanecarboxylate, tetra(3,4-epoxycyclohexylmethyl) butanetetracarboxylate, and di(3,4-epoxycyclohexylmethyl)-4,5-epoxytetrahydrophthalate. However, the compound is not limited to these examples.

Examples of the compound having vinyl ethers include diethylene glycol divinyl ether, triethylene glycol divinyl ether, butanediol divinyl ether, hexanediol divinyl ether, cyclohexanedimethanol divinyl ether, hydroxybutyl vinyl ether, ethyl vinyl ether, dodecyl vinyl ether, trimethylolpropane trivinyl ether, and propenyl ether propylene carbonate. However, the compound is not limited to these examples. The vinyl ether compound is generally a cation polymerizable. However, when combined with an acrylate, the vinyl ether compound is radical-polymerizable.

Examples of the compound having oxetane groups include 1,4-bis[(3-ethyl-3-oxetanylmethoxy)methyl]benzene, and 3-ethyl-3-(hydroxymethyl)-oxetane.

These cation polymerizable compounds may be used alone or in the form of a mixture of two or more thereof. The above-mentioned photopolymerizable compound is not limited to these compounds. A fluorine atom (F) may be introduced into the photopolymerizable compound to make the compound low in refractive index to generate a sufficient refractive index difference (in the anisotropic optical film). In order to make the compound high in refractive index, a sulfur atom (S), a bromine atom (Br) or a metal atom that may be of various types may be introduced thereinto. As disclosed in JP 2005-514487 W, it is effective to add, to the photopolymerizable compound, functional superfine particles in each of which a photopolymerizable functional group, such as an acrylic, methacrylic or epoxy group, is introduced onto the surface of a superfine particle made of a high-refractive-index metal oxide such as titanium oxide ($TiO_2$), zirconium oxide ($ZrO_2$), or tin oxide ($SnO_x$).

Photocurable Compound Having a Silicone Skeleton:

The photocurable compound is preferably a photocurable compound having a silicone skeleton. The photocurable compound having a silicone skeleton is oriented by a structure (mainly an ether bond) thereof, so as to be polymerized and solidified, thereby forming a low-refractive-index region, a high-refractive-index region, or a low-refractive-index region and a high-refractive-index region. The use of the photocurable compound having a silicone skeleton makes the rectangularly columnar regions easy to bend, so that the anisotropic optical film is improved in light condensing property in the front surface direction.

The low-refractive-index region corresponds to the rectangularly columnar regions or the matrix region, and the other of the two region species corresponds to the high-refractive-index region.

In the low-refractive-index regions, it is preferred that the proportion of a silicone resin, which is a cured product of the photocurable compound having a silicone skeleton, is relatively large. This manner makes it possible to bend the diffusion central axes more easily, so that the anisotropic optical film is improved in light condensing property in the front surface direction.

The silicone resin contains a larger proportion of silicon (Si) than compounds having no silicone skeleton. A relative proportion of the amount of the silicone resin can be checked by use of an EDS (energy-dispersible X-ray spectrometer), using this atom silicon as an index.

The photocurable compound having a silicone skeleton is a monomer, oligomer, prepolymer or macromonomer having radical polymerizable or cation polymerizable functional groups. Examples of the radical polymerizable functional group(s) include acryloyl, methacryloyl, and allyl groups. Examples of the cation polymerizable functional group(s) include epoxy and oxetane groups. The kind and the number of the functional group(s) of the compound are not particularly limited. As the number of the functional group(s) is larger, the resultant polymer is raised in crosslinkage density so that the refractive index difference is favorably generated with ease. The photocurable compound preferably has a polyfunctional acryloyl or methacryloyl group. The compound having a silicone skeleton may be insufficient in compatibility with other compounds because of the structure thereof. However, in such a case, the compound may be urethanized to be heightened in the compatibility. In the present invention, it is preferred to use a silicone/urethane/(meth)acrylate having, at a terminal thereof, an acryloyl or methacryloyl group.

The weight-average molecular weight (Mw) of the photocurable compound having a silicone skeleton ranges preferably from 500 to 50,000, more preferably from 2,000 to 20,000. When the weight-average molecular weight is in this range, an efficient photocuring reaction is caused so that the silicone resin present in the anisotropic optical film is easily oriented. Following the orientation of the silicone resin, the bending of the diffusion central axes becomes easy.

The silicon skeleton is, for example, a skeleton represented by a general formula (1) illustrated below. In the general formula (1), $R_1$, $R_2$, $R_3$, $R_4$, $R_5$ and $R_6$ each independently have a functional group such as a methyl, alkyl, fluoroalkyl, phenyl, epoxy, amino, carboxyl, polyether, acryloyl, or methacryloyl group.

In the general formula (1), n is preferably an integer of 1 to 500.

[Chemical Formula 1]

Compound Having No Silicone Skeleton:

When a compound having no silicone skeleton is blended into the photocurable compound having a silicone skeleton to form an anisotropic optical film, its low-refractive-index region and high-refractive-index region are easily separated and formed. Thus, the film favorably becomes strong in anisotropic degree. The compound having no silicone skeleton may be, besides a photocurable compound, a thermoplastic resin, or a thermoset resin. These resins may be used together. The photocurable compound may be a polymer, oligomer or monomer having a radical polymerizable or cation polymerizable functional group (provided that the compound has no silicone skeleton). Examples of the thermoplastic resin include polyester, polyether, polyurethane, polyamide, polystyrene, polycarbonate, polyacetal, polyvinyl acetate, and acrylic resin; and copolymers and modified products thereof. When the thermoplastic resin is used, the thermoplastic resin is dissolved into a solvent in which the resin is soluble and then the solution is painted and dried. After the drying, the photocurable compound having a silicone skeleton is then cured by ultraviolet rays to form an anisotropic optical film. Examples of the thermoset resin include epoxy resin, phenolic resin, melamine resin, urea resin, and unsaturated polyester; and copolymers and modified products thereof. When the thermoset resin is used, the photocurable compound having a silicone skeleton is cured with ultraviolet rays and then the resultant is appropriately heated to cure the thermoset resin, thereby forming an anisotropic optical film. The compound having no silicone skeleton is most preferably a photocurable compound since the compound makes the anisotropic optical film excellent in productivity for, for example, the following reasons: the low-refractive-index region and high-refractive-index region are easily separated from each other; the solvent required in the case of using the thermoplastic resin is unrequired and thus a drying step therefor is unrequired; and a thermosetting step as required for the thermoset resin is unrequired.

The refractive index difference (absolute value) between the low-refractive-index and high-refractive-index regions is preferably 0.02 or more, more preferably 0.03 or more, even more preferably 0.04 or more. As the refractive index difference becomes larger, the anisotropic optical film becomes larger in anisotropic degree. Additionally, it is easier to check whether or not tabular structures are formed (in the film) through, for example, an optical microscope.
One Component (Photoinitiator) of Raw Material of Anisotropic Optical Film Examples of the photoinitiator capable of polymerizing the radical polymerizable compound include benzophenone, benzil, Michler's ketones, 2-chlorothioxanthone, 2,4-diethylthioxanthone, benzoin ethyl ether, benzoin isopropyl ether, benzoin isobutyl ether, 2,2-diethoxyacetophenone, benzyldimethyl ketal, 2,2-dimethoxy-1,2-diphenylethane-1-one, 2-hydroxy-2-ethyl-1-phenylpropane-1-one, 1-hydroxycyclohexyl phenyl ketone, 2-methyl-1-[4-(methylthio) phenyl]-2-morpholinopropanone-1,1-[4-(2-hydroxyethoxy)-phenyl]-2-hydroxy-2-methyl-1-propane-1-one, bis(cyclopentadienyl)-bis(2,6-difluoro-3-(pyl-1-yl) thitanium, 2-benzyl-2-dimethylamino-1-(4-morpholinophenyl)-butanone-1, and 2,4,6-trimethylbenzoyldiphenylphosphine oxide. These compounds may be used alone or in the form of a mixture of two or more thereof.

The photoinitiator for the cation polymerizable compound is a compound which generates an acid by irradiation with light to make the cation polymerizable compound polymerizable by effect of the generated acid. In general, the compound is preferably an onium salt or a metallocene complex. The onium salt is, for example, a diazonium salt, sulfonium salt, iodonium salt, phosphonium salt or selenium, salt. As a counter ion of such a salt, for example, the following anion is used: $BF_4^-$, $PF_6^-$, $AsF_6^-$ or $SbF_6^-$. Specific examples of the salt include 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenylthiophenyl)diphenylsulfonium hexafluorophosphate, bis[4-(diphenylsulfonio)phenyl]sulfide-bishexafluoroantimonate, bis(4-(diphenylsulfonio)phenyl sulfide-bis-hexafluorophosphate, (4-methoxyphenyl)diphenylsulfonium hexafluoroantimonate, (4-methoxyphenyl) phenyliodonium hexafluoroantimonate, bis(4-t-butylphenyl) iodonium hexafluorophosphate, benzyltriphenylphosphoium hexafluorcantimonate, triphenylselenium hexafluorophosphate, (η5-isopropylbenzene) (η5-cyclopentadienyl)iron (II) hexafluorophosphate. However, the salt is not limited to these compounds. These compounds may be used alone or in the form of a mixture of two or more thereof.

Raw Material (Blend Proportions of the Components, and Other Optional Components) of Anisotropic Optical Film In the present invention, the photoinitiator is blended, into 100 parts by weight of the photopolymerizable compound, in an amount from about 0.01 to 10 parts by weight, preferably from about 0.1 to 7 parts by weight, more preferably from about 0.1 to 5 parts by weight. If the amount is less than 0.01 parts by weight, the photocuring performance is lowered. If the amount is more than 10 parts by weight, the resin is cured only at the outer surface thereof so that the inside is lowered in curability. Beside this inconvenience, the coloring (of the film), and the formation of the rectangularly columnar regions are hindered. The photoinitiator is usually used in the state that a powder thereof is directly dissolved in the photopolymerizable compound. However, when the photoinitiator is poor in solubility, a product is usable in which the photoinitiator is beforehand dissolved into a very slight amount of a solvent to have a high concentration. This solvent is more preferably photopolymerizable. Specific examples thereof include propylene carbonate, and γ-butyrolactone. In order to improve the photoinitiator in photopolymerizing performance, a known dye or sensitizer that may be of various types may be added thereto. Together with the photoinitiator, a thermosetting initiator is usable which is capable of setting or curing the photopolymerizable compound through heating. In this case, it is expectable that the heating after the photocuring further promotes the polymerization and curing of the photopolymerizable compound to be completed.

In the present invention, the above-mentioned photocurable compounds are cured alone or in the form of a composition in which two or more thereof are mixed, so as to make it possible to form an anisotropic optical film. The anisotropic optical film of the present invention can also be formed by curing a mixture composed of one or more of the photocurable compounds and a polymeric resin having no photocurability. Examples of the polymeric resin used in this case include acrylic resin, styrene resin, styrene-acrylic copolymer, polyurethane resin, polyester resin, epoxy resin, cellulose based resin, vinyl acetate based resin, vinyl chloride-vinyl acetate copolymer, and polyvinyl butyral resin. These polymeric resins each need to have a sufficient compatibility with the photocurable compound(s) before the compound(s) is/are photocured. In order to cause the resin and the compound(s) to ensure the compatibility, an organic solvent, a plasticizer or some other that may be of various types can be used. When an acrylate is used as the photocurable compound(s), it is preferred from the viewpoint of the compatibility to select the polymeric resin from acrylic resin species.

The ratio by mass of the photocurable compound having a silicone skeleton to the compound having no silicone skeleton ranges preferably from 15:85 to 85:15, more preferably from 30:70 to 70:30. When the ratio is set into this range, phase separation between the low-refractive-index region and the high-refractive-index region advances easily and further the rectangularly columnar regions are easily bent. If the proportion of the photocurable compound having a silicone skeleton is less than the lower limit value or more than the upper limit value, the phase separation does not advance easily and the rectangularly columnar regions are not easily bent. In the case of using silicone/urethane/(meth)acrylate as the photocurable compound having a silicone skeleton, the compound is improved in compatibility with the compound having no silicone skeleton. The use makes it possible to bend the rectangularly columnar regions even when the blend ratio in the material is widely varied.

[Process]

Figure 2A:
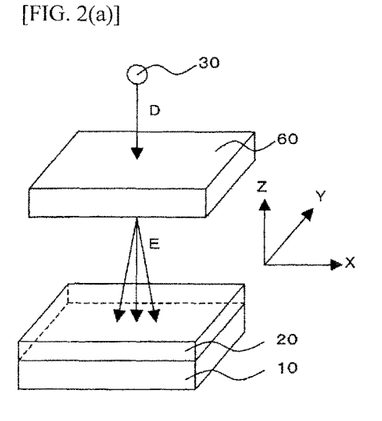
FIGS. 2(a) and 2(b) are each a schematic view illustrating a method for producing an anisotropic optical film of the present invention.
Figure 2B:
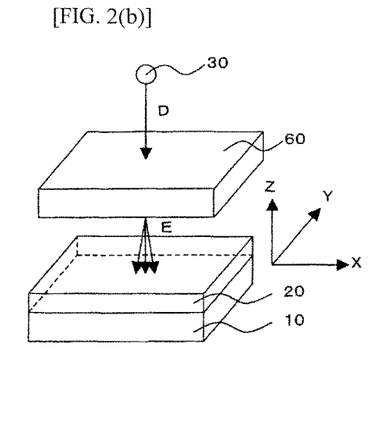

The following will describe a method (process) for producing the anisotropic optical film of the present invention with reference to FIG. 2. By performing steps described below successively, the anisotropic optical film of the invention can be yielded:

(1) the step of obtaining parallel rays D from a light source 30;

(2) the step of radiating the parallel rays D into a directional diffusion element 60 to yield light rays E having a directivity; and (3) the step of radiating the light rays E having the directivity into a photocurable composition layer 20 to cure the photocurable composition layer.

In any one of FIGS. 2(a) and 2(b), the anisotropic optical film of the present invention can be yielded. A difference between FIG. 2(a) and FIG. 2(b) is that the stretch of the light rays E having directivity is large in FIG. 2(a) whereas small in FIG. 2(b).

Dependently on the degree of the stretch of the light rays E having directivity, the size of the rectangularly columnar regions is varied.

The stretch of the light rays E having directivity depends mainly on the distance between the directional diffusion element 60 and the photocurable composition layer 20, and the kind of the directional diffusion element 60. As this distance is made shorter, the size of the rectangularly columnar regions becomes smaller. As the distance is made longer, the size of the rectangularly columnar regions becomes larger. Accordingly, by adjusting the distance, the size of the rectangularly columnar regions is adjustable.

Light Source:

The light source for radiating light rays to the photocurable-compound-containing composition is usually an ultraviolet-generating short-arc light source. The light source may be specifically, for example, a high-pressure mercury lamp, a low-pressure mercury lamp, a metal halide, or a xenon lamp. The light rays to be radiated to the photocurable-compound-containing composition need to contain a wavelength capable of curing the photocurable compound. The light rays are usually light rays having a central wavelength of 365 nm, which is the wavelength of a mercury lamp. However, any lamp is usable as far as the lamp is a light source containing a wavelength near the absorption wavelength of the used photopolymerization initiator. By curing the photocurable composition layer, the anisotropic optical film (of the invention) is formed.

In order to produce parallel rays D from the short-arc UV light source, for example, a reflecting mirror is arranged in the rear of the light source to radiate light from the light source as a point light source into a predetermined direction. In this way, the parallel rays can be obtained. The use of the point light source makes it possible to give parallel rays easily.

Directional Diffusion Element:

The directional diffusion element 60 is an element for giving directivity to the incident parallel rays D. In each of FIG. 2, an embodiment is illustrated in which light rays E having directivity diffuse in a large proportion in X-direction while the rays E hardly diffuse in Y-direction. In order to obtain light rays having such directivity, for example, a method is adopted in which a needle-form filler having a high aspect ratio is incorporated into the directional diffusion element 60 and further the needle-form filler is oriented to extend its long axis direction in Y-direction. For the directional diffusion element, various methods are usable besides the needle-form-filler used method. In accordance with the kind of the directional diffusion element, the light diffusing property thereof is varied through an incident portion of the directional diffusion element; it is however advisable to arrange the directional diffusion element 60 to gain light rays E having directivity by passing the parallel rays D through the directional diffusion element 60.

The aspect ratio of the light rays E having directivity is preferably set into the range of 5 to 40. Correspondingly substantially to this aspect ratio, the aspect ratio of the rectangularly columnar regions is generated.

The lower limit value of the aspect ratio is preferably 5, more preferably 8, even more preferably 10. As the aspect ratio becomes smaller, there is a problem with the diffusion field becoming narrower.

The upper limit value of the aspect ratio is preferably 40, more preferably 30. As the aspect ratio becomes larger, there is a problem with the anisotropic optical film becoming more insufficient in light diffusing property and light condensing property.

Curing:

The light rays E having the directivity is radiated into the photocurable composition layer 20 to cure the photocurable composition layer. This manner makes it possible to yield the anisotropic optical film of the present invention.

For the photocurable composition layer 20, the photocurable composition is painted onto an appropriate substrate 10 such as a transparent polyethylene terephthalate (PET) film to form a coating layer (i.e., the photocurable composition layer). As required, the coating layer is dried to vaporize the solvent. The dry thickness thereof is preferably from 30 µm to 200 µm. The lower limit value of the dry thickness is more preferably 50 µm. As the thickness is made larger, the rectangularly columnar regions are more easily bent. The upper limit value of the dry thickness is more preferably 150 µm, even more preferably 100 µm. As the thickness is made smaller, the anisotropic optical film is improved in productivity. Any one of the preferred value, the more preferred value and the even more preferred value of the lower limit value of the dry thickness may be appropriately combined with any one of those of the upper limit value thereof. If the dry thickness is less than 30 µm, the photocurable composition layer is unfavorably poor in light diffusing property. Conversely, if the dry thickness is more than 200 µm, the whole of the layer is too strong in diffusing property so that the anisotropy that is a characteristic of the present invention is not easily obtained. In addition, unfavorably, costs increase and the anisotropic optical film is unsuitable for articles required to be made thinner. Furthermore, a release film, or a mask, which will be detailed later, is laminated onto this coating layer or cured film to produce a photosensitive laminate.

The method for forming the photocurable-compound-containing composition into a sheet form onto the substrate may be an ordinary painting method or printing method. Specifically, the method may be, for example, a coating such as air doctor coating, bar coating, blade coating, knife coating, reverse coating, transfer roll coating, gravure roll coating, kiss coating, cast coating, spray coating, slot orifice coating, calender coating, dam coating, dip coating, or die coating; an intaglio printing such as gravure printing; a stencil printing such as screen printing; or some other printing. When the composition is low in viscosity, it is allowable to arrange a weir having a predetermined height on the circumference of the substrate, and cast the composition into a space surrounded by the weir.

In order to produce the anisotropic optical film of the present invention, a mask may be laminated thereonto for preventing the photocurable composition layer from being hindered by oxygen. The material of the mask is not particularly limited. It is necessary to use a sheet which transmits at least one portion of ultraviolet rays radiated into the sheet. Examples of this sheet include transparent sheets each made of a plastic material such as PET, TAC, PVAc, PVA, acrylic polymer, or polyethylene; and sheets each made of an inorganic substance such as glass or quartz. Furthermore, these sheets may contain a pigment for patterning to control the transmitted ultraviolet quantity or for absorbing ultraviolet rays. When the mask is not used, the oxygen hindrance of the photocurable composition layer can be prevented by radiating light to the layer in a nitrogen atmosphere.

The illuminance of the UV rays radiated to the photocurable composition layer ranges preferably from 0.01 to 100 mW/cm², more preferably from 0.1 to 20 mW/cm². If the illuminance is 0.01 mW/cm² or less, a long time is required for the curing so that the anisotropic optical film is deteriorated in production efficiency. If the illuminance is 100 mW/cm² or more, the photocurable compound is too rapidly cured to form the structures. Thus, the film cannot express a target anisotropic diffusibility.

The period when the UV rays are radiated is not particularly limited, and is from 10 to 180 seconds, more preferably from 30 to 120 seconds. Thereafter, the release film is peeled, so that the anisotropic optical film of the present invention can be yielded.

The anisotropic optical film of the present invention is a film obtained by radiating low-illuminance UV rays to the photocurable composition layer for a relatively long period, as described above, thereby forming the specific internal structures in this layer. Thus, only by such a UV radiation, an unreacted fraction of the monomer component(s) may remain so that the resultant film may be sticky, or may have a problem about handleability or endurance. In such a case, an additional radiation of UV rays having a high illuminance of 1000 mW/cm² or more makes it possible to polymerize the remaining monomer fraction. At this time, the UV rays are radiated preferably from a side of the film that is reverse to the mask side thereof.

The means for yielding the internal bent structures in the anisotropic optical film of the present invention is not limited. The means is effectively a method in which when the photocurable-compound-containing composition is cured, a temperature distribution is given to the photocurable composition layer in the thickness direction thereof. The photocurable composition layer referred to herein is a layer in a state before the anisotropic diffusion layer is formed. In other words, the photocurable composition layer is a layer in a state before the photocurable-compound-containing composition is cured. For example, cool wind is given to the ultraviolet-radiated-in surface side of the film to cool the film and further the substrate side thereof is heated through, for example, a temperature-conditioning plate that may be of various types. This way makes it possible to generate a temperature distribution in the composition layer in the thickness direction. The photocurable composition is varied in refractive index in accordance with the temperature, and is bent with the passage of the radiated ultraviolet rays through the inside. The angle, the position, and the direction of the bending can be changed in accordance with the refractive index, the reaction rate and the temperature gradient of the composition, and others. The number of each of the rectangularly columnar regions mainly bent is also adjustable by adjusting the thickness. In this case, the reaction rate is appropriately adjusted in accordance with the reactivity dependent on the blend in the composition itself, and with the viscosity thereof, the intensity of the ultraviolet rays, the kind and amount of the initiator, and others.

Display Device

The anisotropic optical film of the present invention is applicable to display devices such as a liquid crystal display device (LCD), a plasma display panel (PDP), an electroluminescence display (ELD), a cathode-ray tube display device (CRT), a surface electric field display (SED), and an electronic paper. The film is in particular preferably usable in a liquid crystal display device (LCD). The anisotropic optical film of the present invention is formed by curing a photocurable compound having a silicone skeleton, and the film is usable in the state of being bonded to a desired position through an adhesive layer or viscous layer to cause few problems about adhesive strength.

The anisotropic optical film is favorably usable in a transmissive, reflective or semi-transmissive liquid crystal display device.

EXAMPLES

In accordance with methods described below, anisotropic optical films of the present invention and anisotropic optical films of comparative examples were produced.

Example 1

A dispenser was used to form a partition wall of 0.1 mm height on a PET film (trade name: A4300, manufactured by Toyobo Co., Ltd.) 100 μm in thickness and 76×26 mm in size and along the whole of a peripheral edge portion thereof, with curable resin. A photocurable resin composition described below was filled into the inside of the wall, and then the resultant was covered with another PET film.

Silicone/urethane/acrylate (refractive index: 1.460, and weight-average molecular weight: 5,890): 20 parts by weight
(trade name: 00-225/TM18, manufactured by Rahn AG)
Neopentyl glycol diacrylate (refractive index: 1.450): 30 parts by weight
(trade name: Ebecryl 145, manufactured by Daicel-Cytec Co., Ltd.)
An EO adduct diacrylate of bisphenol A (refractive index: 1.536): 15 parts by weight
(trade name: Ebecryl 150, manufactured by Daicel-Cytec Co., Ltd.))
Phenoxyethyl acrylate (refractive index: 1.518): 40 parts by weight
(trade name: Light Acrylate PO-A, manufactured by Kyoeisha Chemical Co., Ltd.)
2,2-Dimethoxy-1,2-diphenylethane-1-one: 4 parts by weight
(trade name: Irgacure 651, manufactured by the company BASF)

This liquid membrane 0.1 mm in thickness, both surfaces of which were sandwiched between the respective PET films, was put onto a hot plate heated to 80° C., and from an air blower, wind was sent onto the front surface to cool the front surface. In this state, from the above thereof, ultraviolet rays were radiated onto the front surface perpendicularly to this surface at an irradiation intensity of 10 mW/cm$^2$ for 1 minute. The ultraviolet rays were rays obtained by converting parallel rays radiated out from a radiating unit, for downward radiation, of a UV spot light source (trade name: L2859-01, manufactured by Hamamatsu Photonics K.K.) to linear light rays through a directional diffusion element for adjusting the aspect ratio of transmitted UV rays to 30. Through the process, an anisotropic optical film of Example 1 was yielded which had many rectangularly columnar regions as has been illustrated in FIG. 1 (however, this example was different in diffusion central axis from that in FIG. 1). From this workpiece, the PET films were peeled to yield an anisotropic optical film of the present invention.

Example 21

An anisotropic optical film of Example 2 was yielded in the same way as in Example 1 except that as the directional diffusion element, a directional diffusion element was used for adjusting the aspect ratio of transmitted UV rays to 20.

Example 3

An anisotropic optical film of Example 3 was yielded in the same way as in Example 1 except that as the directional diffusion element, a directional diffusion element was used for adjusting the aspect ratio of transmitted UV rays to 10.

Example 4

An anisotropic optical film of Example 4 was yielded in the same way as in Example 1 except that production conditions were changed to set the thickness of the liquid membrane to 60 μm, and as the directional diffusion element, a directional diffusion element was used for adjusting the aspect ratio of transmitted UV rays to 10.

Comparative Example 1

An anisotropic optical film of Comparative Example 1 was yielded in the same way as in Example 1 except that no directional diffusion element was used.

The anisotropic optical film of Comparative Example 1 was an anisotropic optical film in which plural columnar structures were formed from the upper surface of the film to the lower surface.

Comparative Example 2

An anisotropic optical film of Comparative Example 2 was yielded in the same way as in Example 1 except that as the directional diffusion element, a directional diffusion element was used for adjusting the aspect ratio of transmitted UV rays to 50.

The anisotropic optical film of Comparative Example 2 was an anisotropic optical film in which the tabular structures illustrated in FIG. 10 were formed (however, the example was different in diffusion central axis from that in FIG. 10).

Comparative Example 3

An anisotropic optical film of Comparative Example 3 was yielded in the same way as in Example 1 except that production conditions were changed to set the thickness of the liquid membrane to 60 μm, and as the directional diffusion element, a directional diffusion element was used for adjusting the aspect ratio of transmitted UV rays to 50.

The anisotropic optical film of Comparative Example 3 was an anisotropic optical film in which the tabular structures illustrated in FIG. 10 were formed (however, the example was different in diffusion central axis from that in FIG. 10).

The afore-mentioned measured weight-average molecular weight (Mw) of the silicone/urethane/acrylate used in each of Examples 1 to 3 was obtained, as the molecular weight in terms of polystyrene, using a GPC method under conditions described below.
Degasser: DG-980-51 (manufactured by JASCO Corp.)
Pump: PU-980-51 (manufactured by JASCO Corp.)
Auto-sampler: AS-950 (manufactured by JASCO Corp.)
Thermostat: C-965 (manufactured by JASCO Corp.)
Columns: Two columns Shodex KF-806L (manufactured by Showa Denko K.K.)
Detector: RI (SHIMAMURA YDR-880)
Temperature: 40° C.
Eluent: THF
Injected amount: 150 μl
Flow rate: 1.0 ml/min
Sample concentration: 0.2%
Anisotropic Optical Film Surface Observation:
One of the surfaces of the anisotropic optical film of each of the working examples and the comparative examples (the surface being the light-radiated side surface at the time of the radiation of the ultraviolet rays) was observed through an optical microscope. The long diameter LA and the short diameter SA of the rectangularly columnar structures were measured. In order to calculate out each of the long diameter LA and the short diameter SA, the average of the diameter of 20 structures selected at will from the structures was calculated. The ratio of the long diameter LA to the short diameter SA was calculated out as the aspect ratio (of the structures).

Anisotropic Optical Film Evaluations:

The anisotropic optical film of each of the working examples and the comparative examples was evaluated, using an angle-variable goniophotometer (manufactured by Genesia Corp.), in which a floodlighting angle of a light source and a light receiving angle of a light receiving unit are variable at will. Its light receiving portion was fixed at a position where straight-going light from the light source was receivable. Into a holder positioned therebetween, the anisotropic optical film obtained in each of the working examples and the comparative examples was set. As illustrated in FIG. 12, the sample was rotated around a rotary axis (L) to measure the linear transmitted light quantity of the sample, correspondingly to each incident angle of the light. According to this evaluating method, an estimation can be made as to what angle range permits the incident light to diffuse. This rotary axis (L) is an axis equivalent to the axis B-B in the sample structure illustrated in FIG. 10, or the axis C-C in the sample structure illustrated in FIG. 1(*a*). The measurement of the linear transmitted light quantity was made about wavelengths in the visible ray range, using a spectral luminous efficacy filter.

About an interference (rainbow) of the anisotropic optical film, the transmitted light was visually observed from various angles to evaluate the degree of the interference.

Figure 3:
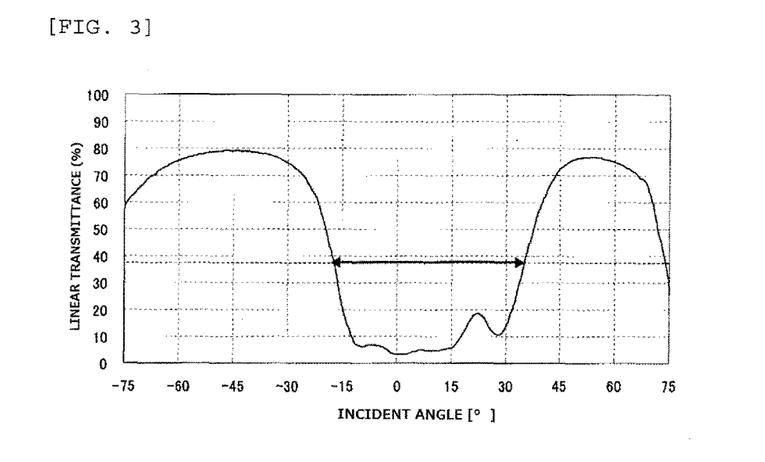
FIG. 3 is an optical profile of an anisotropic optical film of Example 1.
Figure 4:
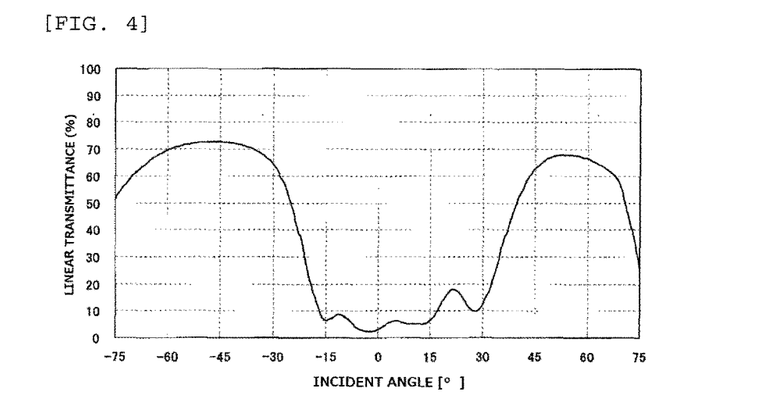
FIG. 4 is an optical profile of an anisotropic optical film of Example 2.
Figure 5:
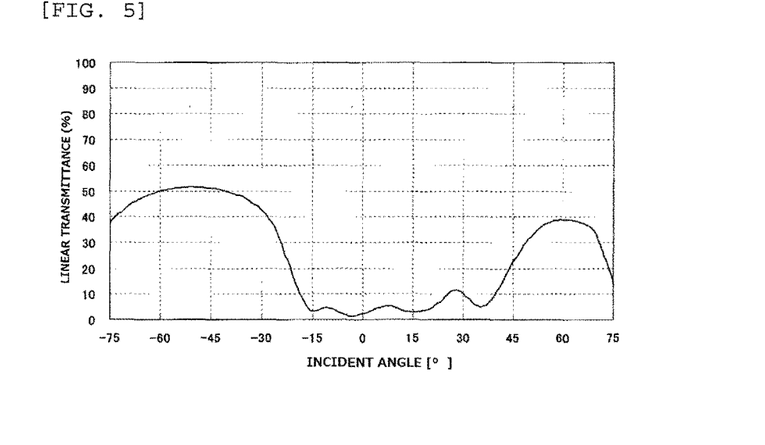
FIG. 5 is an optical profile of an anisotropic optical film of Example 3.
Figure 6:
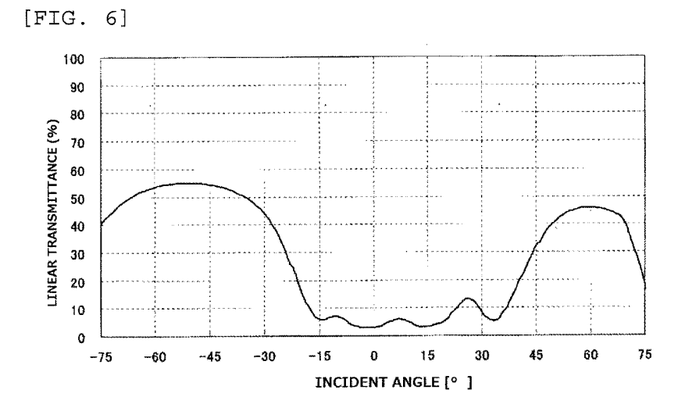
FIG. 6 is an optical profile of an anisotropic optical film of Example 4
Figure 7:
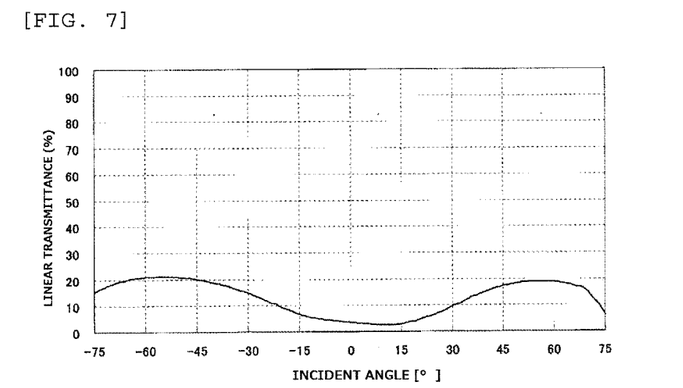
FIG. 7 is an optical profile of an anisotropic optical film of Comparative Example 1.
Figure 8:
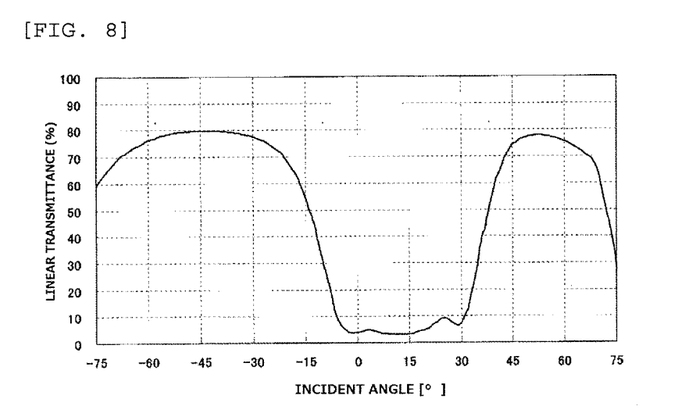
FIG. 8 is an optical profile of an anisotropic optical film of Comparative Example 2.
Figure 9:
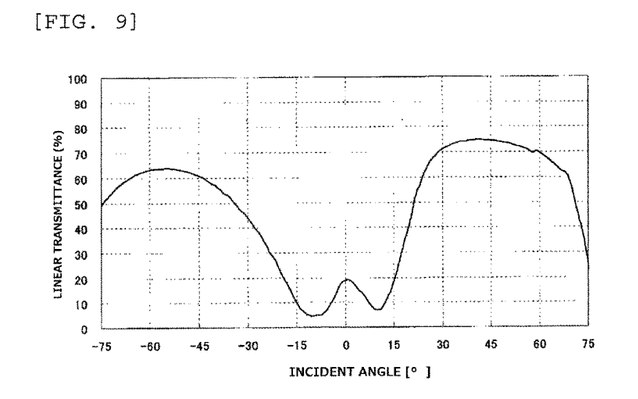
FIG. 9 is an optical profile of an anisotropic optical film of Comparative Example 3.

Results of the working examples that were obtained in the measurement are shown in FIGS. 3 to 6, and ones of the comparative examples are shown in FIGS. 7 to 9. FIG. 3 is about Example 1; FIG. 4, about Example 2; FIG. 5, about Example 3; FIG. 6, about Example 4; FIG. 7, about Comparative Example 1; FIG. 8, about Comparative Example 2; and FIG. 9, about Comparative Example 3. These figures each show the measured incident light dependency of the linear transmitted light quantity.

Figure 13:
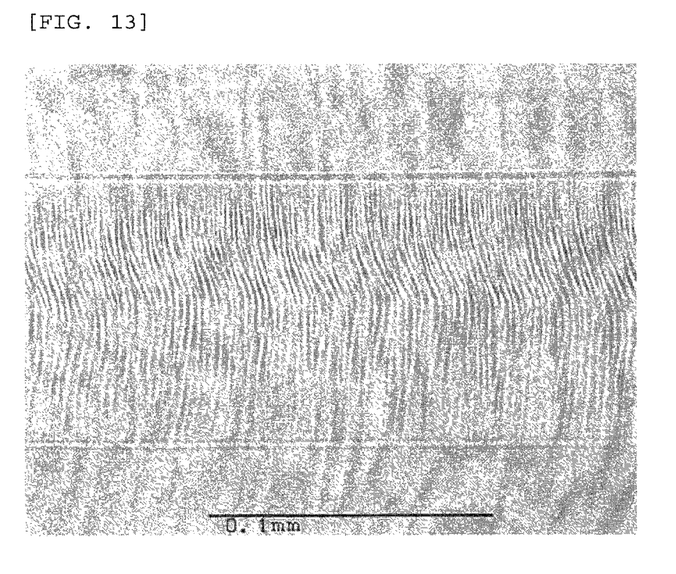
FIG. 13 is an optical microscopic photograph of a cross section of the anisotropic optical film of Example 3.

Observation of Cross Section of Anisotropic Optical Film:

A cross section of Example 3 as a typical example was used through an optical microscope to check the bending state of the rectangularly columnar structures. The result is shown in FIG. 13.

Table 1 shows the shape of the rectangular columns (of each of all the examples), optical properties of the film thereof, and others together.

From the results shown in Table 1, it is understood that the aspect ratio of the rectangularly columnar regions (in the anisotropic optical film of the invention) is correlative with values of the angle range of an incident light diffusion field that corresponds to linear transmittances that are ½ or less of the difference between the maximum and minimum linear transmittances. In the respective anisotropic optical films of Examples 1 to 4, as the rectangularly columnar regions, regions each having an aspect ratio of 6 to 35 were usable, and the angle range of the incident light diffusion field was adjustable into the range of 53° to 70°. Examples 3 and 4 were substantially consistent with each other in the aspect ratio of their rectangular columns, and were different from each other in anisotropic diffusion layer thickness. However, even when the anisotropic diffusion layer thickness was set to about 60 μm, the films of Examples 3 and 4 succeeded in attaining the afore-mentioned angle range of the incident light diffusion field sufficiently practicable. In other words, the anisotropic optical films of Examples 1 to 4 were films about which light diffusion and light condensation were attainable in a wide incident light angle range not to give any unnatural impression.

However, in the anisotropic optical film of Comparative Example 1, in which the aspect ratio of the rectangularly columnar regions was too small, and Comparative Examples 2 and 3, in each of which the aspect ratio was too large, the angle range of the incident light diffusion field failed to be set to 50 or more. In other words, the anisotropic optical films of Comparative Examples 1 to 3 were films about which light diffusion and light condensation failed to be attained in a wide incident light angle range to give an unnatural impression.

From the results shown in Table 1, it is understood that the long diameter LA is correlative with a light interference (rainbow). In the anisotropic optical films of Examples 1 to 4, in which the long diameter LA was from 6 to 42 μm, no light interference (rainbow) was generated, or few practical problems were caused thereabout.

However, in Comparative Examples 2 and 3, in each of which the long diameter LA was too large, light interferences (rainbows) were intensely generated so that practical problems were caused. In Comparative Example 1, in which the long diameter LA was small, no light interference (rainbow) was generated, but the long diameter LA was too small to cause the following values to be adjusted into 50°

TABLE 1

| | Thickness (μm) | Aspect ratio of directional diffusion element | Rectangularly columnar regions | | | Maximum linear transmittance (%) | Minimum linear transmittance (%) | Diffusion width ※1 | Light interference (rainbow) |
|---|---|---|---|---|---|---|---|---|---|
| | | | Long diameter LA (μm) | Short diameter LA (μm) | Aspect ratio | | | | |
| Example 1 | 100 | 30 | 42 | 1.2 | 35 | 79.1 | 3.3 | 53 | Slightly generated |
| Example 2 | 100 | 20 | 16 | 1.2 | 13 | 72.9 | 2.3 | 59 | Not generated |
| Example 3 | 100 | 10 | 7 | 1.2 | 6 | 51.6 | 1.4 | 70 | Not generated |
| Example 4 | 60 | 10 | 6 | 1.0 | 6 | 55.1 | 3.0 | 66 | Not generated |
| Comparative Example 1 | 100 | Not generated | 1.5 | 1.5 | 1 | 21.2 | 2.5 | 46 | Not generated |
| Comparative Example 2 | 100 | 50 | 67 | 1.2 | 56 | 80.0 | 3.2 | 45 | Intensely generated |
| Comparative Example 3 | 60 | 50 | 56 | 1.2 | 47 | 74.9 | 4.7 | 42 | Intensely generated |

*1: The angle range of the incident light diffusion field that corresponds to linear transmittances that are ½ or less of the difference between the maximum and minimum linear transmittances (when FIG. 3 is taken up as an example, a portion represented by arrows on an optical profile corresponds to this range).

or more: values in the angle range of the incident light diffusion field that corresponds to linear transmittances that are ½ or less of the difference between the maximum and minimum linear transmittances.

As shown in Table 1, it is understood that the aspect ratio of the rectangularly columnar regions is reflected on the aspect ratio of the directional diffusion element (in the present invention). Referring to this result, those skilled in the art can adjust respective values of the short diameter SA and the long diameter LA by adjusting the distance between the directional diffusion element, and the photocurable resin composition (before the anisotropic optical film is cured) while taking care of the aspect ratio of the directional diffusion element, so that those skilled in the art can produce an anisotropic optical film having rectangularly columnar regions defined in the present invention.

Furthermore, as illustrated in FIG. 13, it can be considered that the realization of such a wide diffusion field is based on a matter that the adjustment of the aspect ratio and the thickness fulfills the role of the bending of the rectangularly columnar structures to produce the same advantageous effects as produced by an anisotropic optical film that continuously has plural scattering central axes. Also in the other examples of the present invention, their rectangularly columnar structures were bent, as has been illustrated in FIG. 13.

As has been shown in Table 1, the present invention makes it possible to provide an anisotropic optical film which is capable of diffusing and condensing light in a wide incident angle range even when this film merely has a single anisotropic diffusion layer, which gives no unnatural impression, and which does not easily generate light interference (rainbow).

The invention claimed is:

1. A single layer anisotropic optical film having two plain surfaces that are a top surface and a bottom surface, of which a diffusing property varies in accordance with an incident angle that is formed between an incident light, which is incident on the top surface, and a normal direction of the top surface, the film being composed with a plurality of rectangularly columnar regions that extends from the top surface to the bottom surface and a matrix region that surrounds the columnar regions, wherein the columnar regions and the matrix region are composed of an identical compound that is a photocurable compound, being formed by phase separation with a light irradiation, and having different absolute refractive indexes, surface shapes of each of the rectangularly columnar regions on the top surface and the bottom surface has have a short diameter (SA) and a long diameter (LA), the long diameter of the columnar regions ranges from 3.0 µm to 50 µm, the long diameter of the columnar regions is shorter than a width of the film, the width being determined in the same direction as the long diameter is oriented, aspect ratio (SA/LA), which is determined by the short diameter per the long diameter, ranges from 2 to 40, a thickness of the columnar regions, which is determined between the top surface and the bottom surface in a perpendicular direction to these top and bottom surfaces, is larger than the long diameter of the columnar region, the optical film is configured to have an optical profile, which illustrates a relationship of the linear a linear transmittance with respect to the incident angle, is created based on values of the linear transmittance that are observed when the incident angle varies from −75° to +75°, the optical profile having two peak regions and one valley region that intervenes between the peak regions, and the optical film is configured to have a maximum linear transmittance that is 30% or more and less than 95%, and the minimum linear transmittance that is 20% or less.

2. The anisotropic optical film according to claim 1, wherein the thickness of the columnar regions ranges from 30 µm to 200 µm.

3. The anisotropic optical film according to claim 1, wherein the short diameter of the columnar regions further ranges from 0.5 µm to 5.0 µm.

4. A display device, comprising the anisotropic optical film according to claim 1.

5. A method for producing an anisotropic optical film of claim 1, comprising the steps of:

obtaining parallel rays from a light source, radiating the parallel rays into a directional diffusion element to yield diffusion light rays having directivity, and radiating the diffusion light rays having directivity into a photocurable composition layer to cure the photocurable composition layer, thereby forming a plurality of rectangularly columnar regions and a matrix region that are proportional to an aspect ratio of the diffusion light rays having directivity.

6. The method for producing an anisotropic optical film according to claim 5, wherein the diffusion light rays having directivity have an aspect ratio ranging from 2 to 40.

7. The anisotropic optical film according to claim 1, wherein a diffusion width is determined by a different angle between two corresponding incident angles, the diffusion width being ranged from 50° to 80°.

8. The anisotropic optical film according to claim 3, wherein all of the columnar regions has the aspect ratio, further maintaining the aspect ratio from the top surface to the bottom surface.

* * * * *